United States Patent
Debaes et al.

(10) Patent No.: US 11,089,080 B2
(45) Date of Patent: Aug. 10, 2021

(54) BROKER FOR PROVIDING VISIBILITY ON CONTENT OF STORAGE SERVICES TO AN APPLICATION SERVER SESSION

(71) Applicant: AWINGU NV, Ghent (BE)

(72) Inventors: Christof Debaes, Lembeek (BE); Kurt Bonne, Haren (BE); Pieter De Clerck, Zwijnaarde (BE)

(73) Assignee: AWINGU NV, Ghent (BE)

( * ) Notice: Subject to any disclaimer, the term of this patent is extended or adjusted under 35 U.S.C. 154(b) by 248 days.

(21) Appl. No.: 16/076,245

(22) PCT Filed: Feb. 8, 2017

(86) PCT No.: PCT/EP2017/052777
§ 371 (c)(1),
(2) Date: Aug. 7, 2018

(87) PCT Pub. No.: WO2017/137450
PCT Pub. Date: Aug. 17, 2017

(65) Prior Publication Data
US 2020/0204607 A1     Jun. 25, 2020

(30) Foreign Application Priority Data
Feb. 9, 2016   (EP) .................................. 16154888

(51) Int. Cl.
*H04L 29/08* (2006.01)
*H04L 29/06* (2006.01)

(52) U.S. Cl.
CPC .......... *H04L 67/02* (2013.01); *H04L 29/0809* (2013.01); *H04L 63/08* (2013.01);
(Continued)

(58) Field of Classification Search
CPC ....... H04L 67/02; H04L 69/329; H04L 67/42; H04L 63/08; H04L 29/0809; H04L 67/14;
(Continued)

(56) References Cited

U.S. PATENT DOCUMENTS

| | | | |
|---|---|---|---|
| 9,055,139 B1* | 6/2015 | Devireddy | ............... H04L 67/42 |
| 2002/0083183 A1* | 6/2002 | Pujare | ..................... H04L 67/16 |
| | | | 709/231 |

(Continued)

FOREIGN PATENT DOCUMENTS

| | | |
|---|---|---|
| EP | 2704398 A1 | 3/2014 |
| EP | 2706467 A1 | 3/2014 |

(Continued)

OTHER PUBLICATIONS

Extended European Search Report from EP Application No. EP 16154888.8, dated Aug. 4, 2016.

(Continued)

*Primary Examiner* — Aaron N Strange
(74) *Attorney, Agent, or Firm* — Workman Nydegger

(57) ABSTRACT

A broker is adapted to control an application session managed by an application server session on a remote application server. The broker includes a receiving module receiving from a request for the application session; a connecting module connecting with one or more storage services; a selected content determining unit determining selected content in the one or more storage services which may be visualized by the application server session; a session controlling unit allowing the application server session to visualize the selected content; and an application streamer generating a representation of a web page incorporating the application session; and streaming the representation of the web page to the client browser.

9 Claims, 5 Drawing Sheets

(52) U.S. Cl.
CPC .............. *H04L 67/14* (2013.01); *H04L 67/42* (2013.01); *H04L 69/329* (2013.01)

(58) Field of Classification Search
CPC . H04L 67/2809; H04L 67/2823; H04L 67/04; G06F 16/95; G06F 16/9577
See application file for complete search history.

(56) References Cited

U.S. PATENT DOCUMENTS

| | | | | |
|---|---|---|---|---|
| 2009/0313322 | A1* | 12/2009 | Sheehan | H04L 67/02 709/203 |
| 2010/0281042 | A1* | 11/2010 | Windes | H04N 21/4325 707/756 |
| 2011/0016214 | A1* | 1/2011 | Jackson | G06F 9/505 709/226 |
| 2011/0153853 | A1 | 6/2011 | London et al. | |
| 2014/0032644 | A1* | 1/2014 | Saxena | G06F 9/5055 709/203 |
| 2014/0122570 | A1* | 5/2014 | Narvaez | H04L 65/1069 709/203 |
| 2014/0230011 | A1* | 8/2014 | Drewry | H04L 63/0435 726/1 |
| 2014/0373098 | A1* | 12/2014 | Fausak | H04L 63/102 726/4 |
| 2015/0180926 | A1* | 6/2015 | Oncel | H04L 67/06 709/219 |
| 2015/0237097 | A1 | 8/2015 | Devireddy et al. | |
| 2016/0119342 | A1* | 4/2016 | Kus | H04L 63/08 713/154 |
| 2016/0179855 | A1* | 6/2016 | Roman | G06F 16/182 707/744 |
| 2016/0234276 | A1* | 8/2016 | Ouyang | H04L 65/403 |
| 2017/0264659 | A1* | 9/2017 | Raju | G06F 9/5044 |
| 2019/0026452 | A1* | 1/2019 | Wang | G06F 21/32 |

FOREIGN PATENT DOCUMENTS

| | | | | |
|---|---|---|---|---|
| WO | WO-2014043277 | A2 * | 3/2014 | ............. H04W 4/60 |
| WO | WO-2017016568 | A1 * | 2/2017 | ........... A63F 13/358 |

OTHER PUBLICATIONS

International Search Report from PCT Application No. PCT/EP2017/052777, dated Apr. 21, 2017.

* cited by examiner

BROKER FOR PROVIDING VISIBILITY ON CONTENT OF STORAGE SERVICES TO AN APPLICATION SERVER SESSION

FIELD OF THE INVENTION

The present invention generally relates to providing visibility on content of storage services.

BACKGROUND OF THE INVENTION

The recent development of storage services, such as cloud storage solutions, allows individuals and companies to store data on storage services instead of locally saving sometimes large amounts of data on their local computers. This considerably minimizes the storage space needed at the side of the individuals and companies, and further allows them to access the data from a plurality of devices in a plurality of locations. For example, individuals and companies can store sensitive data files, music files, video files, pictures, software pieces, etc. on storage services and remotely access them by logging into the storage services. Such cloud storage solutions are for example known under the trademark names Dropbox, Google Drive, iCloud, etc. These data files can be accessed via virtual desktop services which performance is optimized, such as the ones described in the patent application US2015/0237097 of Cisco Technology Inc. and in the patent application US2011/0153853 of Microsoft Corporation. The patent application EP2706467 of Awingu NV describes a cloud storage system which foresees a cloud cache store for caching items in HTML format for viewing purposes. When the content item is accessed for edit purposes, the cloud broker shall tunnel the request towards a cloud application that retrieves the editable version of the content item from the cloud data store and delivers it to the client application. When the content item is accessed for view purposes only, the cloud broker shall request a cloud cache agent, responsible for generating the HTML versions of the content item, to deliver the appropriate HTML version to the client application. The cloud cache agent shall retrieve a URL to the appropriate HTML version from the cloud cache store. Hence, based on the device action, i.e. "Edit" or "view", the content item will be delivered in a format suitable for the device with minimal delay and minimal impact on network resource usage.

Even though authentication parameters may be requested by the storage services in order to access the data stored on the storage services, additional problems regarding security, architecture and governance of the handling of the data remain. Indeed, an individual of a company logging in the storage service may for example become aware of the architecture of the storage service, even though his authentication parameters only allow him to access and browse the content of one directory of the storage service. This could threaten the global security and integrity of the storage service. Additionally, the data stored on cloud storage solutions such as Dropbox, Google Drive, iCloud, etc., is synchronized to a plurality of end-user devices. After the data is synchronized, credentials are no longer needed to access the data. This could further threaten the global security and integrity of the storage service.

Application workspaces, such as for example known under the trademark name Amazon WorkSpaces, are managed desktop computing services in the cloud. End-users of the Amazon WorkSpaces are provided access to documents, applications, and resources stored on Amazon storage services, from any supported device, such as desktop and laptop computers, tablets, smartphones, etc., and without procuring or deploying hardware or installing complex software. Tasks such as patching and maintenance, and managing hardware and software are taken care of by Amazon WorkSpaces, providing an easy, cost-effective and broadly accessible desktop experience to end-users.

Solutions for synchronizing files and accessing such a managed desktop computing service in the cloud exist. The drive mapping functions as a gateway which discovers and indexes the files of individuals and companies stored on Amazon storage services. In other words, the gateway does not replicate data, it indexes data about the files including a location in Amazon storage services where the files can be downloaded.

Thanks to the indexation of the data, an end-user using a storage service comprising such a gateway is not aware of the architecture of the storage service. An application must be downloaded by each end-user of the storage service and installed onto the Amazon application workspace. Therefore, to each storage service corresponds a gateway stored on the application workspace. Each gateway must be configured through the application in order to configure access of the end-user to the respective storage service. Additionally, each gateway must be configured for each end-user of the storage service. This makes such an implementation complex and resource intensive.

Additionally, the above-mentioned solution requires a synchronization of all the files of all the end-users to all the application workspaces. This requirement makes the deployment of practices such as distance learning complicated. Typically a large number of students have their data stored on cloud storage solutions for example known under the trademark names Dropbox, Google Drive, iCloud, etc., and the above-mentioned solution requires to synchronize all their data to the application workspaces.

It is an objective of the present invention to disclose a web broker that overcomes the above identified shortcomings of existing solutions. More particularly, it is an objective to disclose a broker for providing a standardized access to a storage service while guaranteeing the security of the storage service in a simple manner.

SUMMARY OF THE INVENTION

According to a first aspect of the present invention, the above defined objectives are realized by a broker for controlling an application session of an application managed by an application session on a remote application server and streamed to a client browser, the broker comprising:
a receiving module, adapted to receive a request for the application session;
a connecting module, configured to receive the request and to connect with one or more storage services according to the request;
a selected content determining unit adapted to determine based on one or more rules selected content in the one or more storage services which may be visualized by the application server session on the remote application server;
a session controlling unit, adapted to allow the application server session on the remote application server to visualize the selected content in the one or more storage services; and
an application streamer, adapted to:
  generate a representation of a web page incorporating the application session; and
  stream the representation of the web page to the client browser.

In accordance with the present invention, a broker acts as an intermediate platform between one or more clients of applications and backend servers comprising one or more remote application servers on which the applications run. The visibility on the content of one or more storage services is centrally controlled by the broker according to the present invention. In other words, the broker according to the present invention determines for all the remote application servers selected content of the storage services which may be visualized by application server sessions of the remote application servers. Configuring visibility of application server sessions of remote application servers to storage services therefore does not require the installation of a gateway on each application workspace of the remote application servers and therefore does not require the allocation of storage space in each application workspace for a gateway. Additionally, thanks to this intermediate platform between the remote application servers and the storage services, application sessions and thereby clients are not always provided with a visibility on the complete content of the storage services and are therefore not aware of the complete architecture of the storage services. The application sessions are also only provided visibility on selected content through the broker and therefore do not have direct visibility or access to the content of the storage services. This improves the security and the integrity of the storage services. Additionally, a single broker configures the visibility of a plurality of application server sessions of a plurality of remote application servers on a plurality of storage services. For example, each application session may request access to more than one storage services. The broker then determines selected content of each of the requested storage services in a standardized manner for this application session. For example, a plurality of application sessions may request content from a single storage service. The broker then determines selected content of the single storage service in a standardized manner for the plurality of application server sessions. This improves the experience of application sessions towards storage services. Additionally, with a broker in accordance with the present invention, it is not necessary to synchronize all the files of all the clients to all the remote application servers. This saves processing power and makes certain practices simple, for example distance learning, where typically a large number of students have their data stored on cloud storage solutions for example known under the trademark names Dropbox, Google Drive, iCloud, etc.

A broker according to the present invention is a connection broker adapted to assign resources to clients, and to provide clients with consistent, reliable access to remote application servers. A broker may be a web broker adapted to mediate between a client browser and a remote application server. Alternatively, a broker may be adapted to mediate between a dedicated client application which is not a client browser, and a remote application server. An application session according to the present invention is an information interchange between a client and a remote application server. An application session is managed by an application server session on a remote application server.

The selected content comprises one or more files and/or programs and/or applications stored on the one or more storage services. For example, the selected content comprises images in a .jpeg format and/or images in a .png format and/or executables and/or text files and/or applications, etc. The selected content of the one or more storage devices may be the full content of the one or more storage devices. Alternatively, the selected content of the one or more storage devices is a subset of one or more storage devices, i.e. selected content from one storage device and/or selected content from a different storage device. The selected content is determined by the broker according to the present invention based on one or more rules. The one or more rules are indicative for a right of an application server session to visualize content in the one or more storage services. The one or more rules are generated by the broker to determine which content of the one or more storage services may be visualized by each application server session in the one or more storage services upon reception of a request from the corresponding application session. In other words, the broker determines selected content of the one or more storage services based on the one or more rules for an application server session such that the broker provides the corresponding application server session with visibility on this selected content in the one or more storage services without trespassing the rights of the corresponding application server session. Allowing an application server session on a remote application server to visualize selected content in one or more storage services corresponds to providing the application server session on the remote application server with visibility on the selected content in the one or more storage services.

A web broker is to be understood as a service broker in service-oriented architecture, i.e. as a broker adapted to mediate between a client browser and a remote application server.

The broker provides a plurality of application server sessions with visibility on selected content from one or more storage services. The remote application servers as well as the clients involved in the application sessions may not comprise identical operating systems or applications. In other words, the broker streams the selected content to the clients, for example to the browsers of clients, independently from the nature and the version of the operating systems of the clients, and independently from the applications and from the version of the applications running on the remote application servers. The application sessions therefore must not be independently configured to be provided with visibility on selected content stored on storage services. In other words, clients which do not support direct access to storage services may however be streamed selected content from the storage services by the broker. This makes the delivery of selected content to an application session universal. Additionally, only a browser, for example a HTML5 browser, may be required at the side of the client in order to be streamed selected content from a storage service. This simple and light implementation at the side of the client minimizes the configuration of the client. A client may therefore visualize the selected content on a plurality of client devices on which for example a browser is installed, for example a desktop computer, a laptop, a tablet, a smartphone, etc.

According to an optional aspect of the invention, the session controlling unit is further adapted to provide the visibility on selected content to the remote application server via a remote desktop protocol.

According to an optional aspect of the invention, the session controlling unit is further adapted to allow the application server session on the remote application server to visualize the selected content in the one or more storage services via a remote desktop protocol.

This way, providing visibility on the selected content is made simple. Instead of deploying a gateway on each remote application servers, the broker acts as a single remote desktop protocol virtual channel session host for all the remote application servers. Each application server session is then provided with visibility on selected content from the storage services remotely through the broker. Additionally, when the remote desktop protocol virtual channel needs upgrading or patching, the action is performed once on the broker, and is made available to all the remote application servers without further configuration on the remote application servers themselves.

According to an optional aspect of the invention, the connecting module is further adapted to connect with one or more storage services according to a file service protocol.

The broker connect with storage services according to a file service protocol, in order to take advantage of advanced network file system features such as for example locking, Unicode, i.e. advanced internationalization, hardlinks, dfs, i.e. hierarchical, replicated name space, distributed caching and native Transmission Control Protocol names, etc. A file service protocol is one or more of the group of: common internet file system specification, also referred to as CIFS, network file system, also referred to as NFS, file transfer protocol also referred to as FTP, Web Distributed Authoring and Versioning also referred to as WebDAV, and file service protocols for example known under the trademark names OneDrive, Box, Dropbox, Storage Made Easy also referred to as SME, Amazon Simple Storage Service also referred to as S3, SharePoint, Nomadesk, and Stewart, etc.

The broker is able to select content of one or more storage services based upon one or more rules. The rules may be stored on the broker. Alternatively, the rules may be stored on the storage services.

According to an optional aspect of the invention, the broker further comprises a rule generating administrator interface operationally coupled to the selected content determining unit and enabling an administrator to generate the one or more rules.

This way, one or more rules may be generated by the web broker in order to select content from one or more storage services. The rules may be generated upon reception of the request of the application session. Alternatively, the rules may be generated when the connecting module connects with one or more storage services.

According to an optional aspect of the invention, the one or more rules based on one or more of the following:
content format;
content type;
the application;
user;
user type;
directory;
geolocation of the client.

This way, features of the content requested by the application session are taken into account when selecting the content of one or more storage services which will be made visible to application server sessions of remote application servers. The format of the content and/or the file extension of a file of the content are parameters which is taken into account when generating rules used to determine selected content. For example, one or more rules may be generated for determining that an application server session of a remote application server may only be provided with visibility on files of one or more storage services with a Word extension. Alternatively, one or more rules may be generated for determining that an application server session of a remote application server may only be provided with visibility on files of one or more storage services with a .jpg extension. This increases the security of the storage services.

This way, features of the content requested by the application session are taken into account when selecting the content of one or more storage services which will be made visible to application server sessions of remote application servers. The type of the content are parameters which are taken into account when generating rules used to determine selected content. For example, one or more rules may be generated for determining that a remote application server may only be provided with visibility on image files of one or more storage services, such as files with a .jpg extension, a .png extension, a .bmp extension, etc. Alternatively, one or more rules may be generated for determining that a remote application server may only be provided with visibility on text files of one or more storage services. This increases the security of the storage services.

This way, features of the application session are taken into account when selecting the content of one or more storage services which will be made visible to application server sessions of remote application servers. For example, the type of the application, the nature of the application session, a time at which the application session was started, a session duration of the application session, a login history of the application session to the storage service, etc. are parameters which may be taken into account when generating rules used to determine selected content. This increases the security of the storage services.

This way, features of a user of the application session are taken into account when selecting the content of one or more storage services which will be made visible to application server sessions of remote application servers. For example, the identity of a user of the application session, the IP address of the user of the application session, a login and/or password of a user of the application session, a login history of the user to the storage service, etc. are parameters which may be taken into account when generating rules used to determine selected content. This increases the level of security of the access to storage services, while allowing personalization of the determination of the selected content.

This way, features of a user of the of the application session are taken into account when selecting the content of one or more storage services which will be made visible to application server sessions of remote application servers. A user type may be taken into account when generating rules used to determine selected content. For example, a user of the application session may belong to a group of users, such as administrators, and/or engineers, and/or administrative, and/or interns, etc. For example, selected content made visible to an intern may differ from selected content made visible to an engineer. This increases the level of security of the access to storage services, while allowing personalization of the determination of the selected content.

This way, application server sessions of remote application servers may not be provided with visibility on the complete architecture of the storage services, which increases the level of security of storage services. For example, a remote application server may be provided visibility on one or more directories of a storage service, but may not be able to visualize the other directories of the storage service.

This way, features of a user of the of the application session are taken into account when selecting the content of one or more storage services which will be made visible to application server sessions of remote application servers. A geolocation of a client may be taken into account when generating rules used to determine selected content. For example, one or more rules may be generated for determining that an application server session of a remote application server may only be provided with visibility on files of one or more storage services when the client is within the vicinity of his company. In other words, the visibility of an application server session of a remote application server on storage services may depend on the geolocation of the client.

According to an optional aspect of the invention, the selected content is a subset of the one or more storage services.

This way, the broker may provide partial visibility on content of one or more storage services.

According to an optional aspect of the invention, the application streamer is further adapted to:

generate a representation of a web page incorporating the application session; and stream the representation of said web page to two or more clients.

The broker streams a representation of a web page incorporating the application session. A client device of the application session must therefore only rely on for example a browser to visualize the selected content. In other words, a light browser client is provided with the selected content by receiving a stream of a representation of a webpage of the application session. The client device resource consumption is therefore minimized. A client may therefore visualize the selected content on a plurality of client devices on which for example a browser is installed, for example a desktop computer, a laptop, a tablet, a smartphone, etc. Additionally, the broker may stream the selected content simultaneously to two or more client devices. This way, a client may be provided with the selected content simultaneously on a plurality of client devices, such as a desktop computer, a laptop, a tablet, a smartphone, etc. Alternatively, two clients may be provided with the same identical selected content on a plurality of client devices.

According to a second aspect of the invention, there is provided a method for controlling an application session of an application managed by an application server session on a remote application server and streamed to a client browser, the method comprising the steps of:

receiving a request for the application session;

connecting with one or more storage services according to the request;

determining based on one or more rules selected content in the one or more storage services which may be visualized by the application server session on the remote application server;

allowing the application server session on the remote application server to visualize the selected content in the one or more storage services;

generating a representation of a web page incorporating the application session; and streaming the representation of the web page to the client browser.

In accordance with the present invention, the visibility on the content of one or more storage services is centrally controlled. In other words, selected content of the storage services which may be visualized by the remote application servers is determined for all the remote application servers. Configuring visibility of remote application servers to storage services therefore does not require the installation of a gateway on each application workspace of the remote application servers and therefore does not require the allocation of storage space in each application workspace for a gateway. Additionally, application sessions and thereby clients are not always provided with a visibility on the complete content of the storage services and are therefore not aware of the complete architecture of the storage services. The application server sessions are also only provided visibility on selected content an intermediate platform and therefore do not have direct visibility or access to the content of the storage services. This improves the security and the integrity of the storage services. Each application session may request access to more than one storage services. Selected content of each of the requested storage services is determined in a standardized manner for this application session. A plurality of application sessions may request content from a single storage service. Selected content of the single storage service is determined in a standardized manner for the plurality of application sessions. This improves the experience of application sessions towards storage services.

DETAILED DESCRIPTION OF EMBODIMENT(S)

Figure 1:
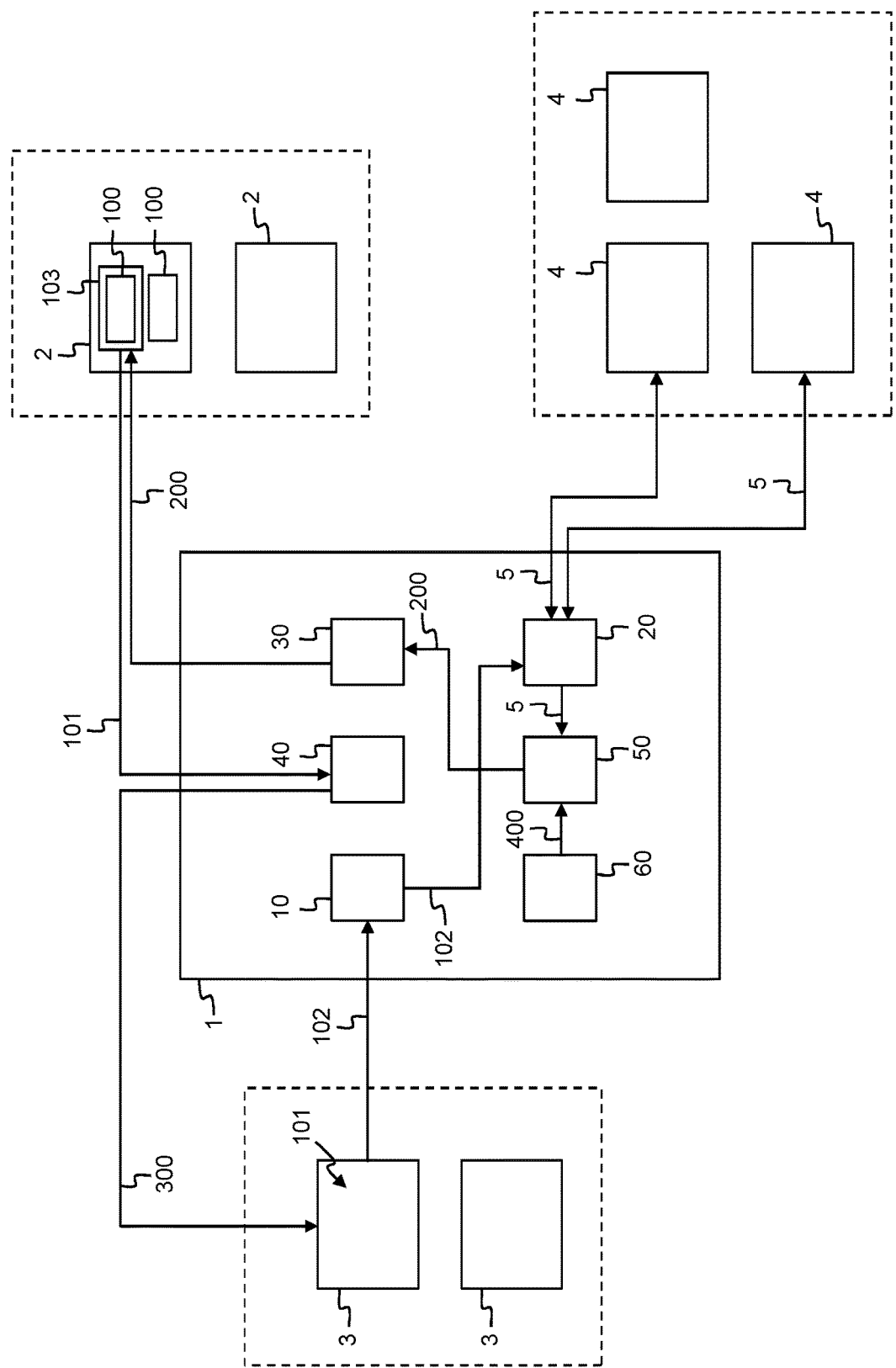
FIG. 1 schematically illustrates an embodiment of a broker according to the present invention.

According to an embodiment shown in FIG. 1, a broker 1 for controlling an application session 101 of an application 100 running on a remote application server 2 comprises a receiving module 10, a connecting module 20, a session controlling unit 30, an application streamer 40, a selected content determining unit 50 and a rule generating administrator interface 60. The receiving module 10 receives a request 102 for the application session 101 of an application 100 running on a remote application server 2. The request 102 is communicated to the connecting module 20, which connects with two storage services 4. According to an alternative embodiment, the connecting module 20 connects with one or more storage services 4, for example one, two, three, four, five, ten, a hundred storage services, etc. The storage services 4 may be for example online storage services such as Google Drive, Amazon, Dropbox, etc., and/or private storage services such as hard disks and/or USB-connected storage services, and/or cloud-based storage services, etc. The connecting module 20 for example connects with the two storage services 4 according to a file service protocol, for example the common internet file system specification, NFS, FTP, WebDAV, and file service protocols for example known under the trademark names OneDrive, Box, Dropbox, Storage Made Easy also referred to as SME, Amazon Simple Storage Service also referred to as S3, SharePoint, Nomadesk, Stewart, etc. The connecting module 20 is provided with visibility on content 5 of the storage services 5. The rule generating administrator interface 60 enables an administrator to generate one or more rules 400. The rules 400 are content format based. According to alternative embodiments, the rules 400 are content type based, or are application based, or are used based, or are user type based, or are directory based, or are geolocation based. A user is a user of the application session 101 of the application 100 running on the remote application server 2. A directory is a directory of a storage service 4. The selected content determining unit 50 is operationally coupled to the connecting module 20 and the selected content determining unit 50 determines selected content 200 of the content 5 of the two storage services 4 based on one or more rules 400 received from the rule generating administrator interface 60. The session controlling unit 30 provides to an application server session 103 of the remote application server 2 visibility on selected content 200 in the two storage services 4. Selected content is a subset of the two storage services 4. The application streamer 40 generates a representation of a web page 300 incorporating the application session 101 and the application streamer 40 streams the representation of the web page 300 to a client 3.

According to an embodiment shown in FIG. 1, a broker 1 for controlling an application session 101 of an application 100 managed by an application server session 103 running on a remote application server 2 comprises a receiving module 10, a connecting module 20, a session controlling unit 30, an application streamer 40, a selected content determining unit 50 and a rule generating administrator interface 60. The receiving module 10 receives a request 102 for the application session 101 of an application 100 running on a remote application server 2. The request 102 is communicated to the connecting module 20, which connects with two storage services 4 according to the request 102. According to an alternative embodiment, the connecting module 20 connects with one or more storage services 4, for example one, two, three, four, five, ten, a hundred storage services, etc. The storage services 4 may be for example online storage services such as Google Drive, Amazon, Dropbox, etc., and/or private storage services such as hard disks and/or USB-connected storage services, and/or cloud-based storage services, etc. The connecting module 20 for example connects with the two storage services 4 according to a file service protocol, for example the common internet file system specification, NFS, FTP, WebDAV, and file service protocols for example known under the trademark names OneDrive, Box, Dropbox, Storage Made Easy also referred to as SME, Amazon Simple Storage Service also referred to as S3, SharePoint, Nomadesk, Stewart, etc. The connecting module 20 is provided with visibility on content 5 of the storage services 5. The rule generating administrator interface 60 enables an administrator to generate one or more rules 400. The rules 400 are content format based. According to alternative embodiments, the rules 400 are content type based, or are application based, or are used based, or are user type based, or are directory based, or are geolocation based. A user is a user of the application session 101 of the application 100 running on the remote application server 2. A directory is a directory of a storage service 4. The selected content determining unit 50 is operationally coupled to the connecting module 20 and the selected content determining unit 50 determines selected content 200 of the content 5 of the two storage services 4 based on one or more rules 400 received from the rule generating administrator interface 60. The selected content determining unit 50 determines selected content 200 which may be visualized by the application server session 103 on the remote application 2. The session controlling unit 30 provides to an application server session 103 of the remote application server 2 visibility on selected content 200 in the two storage services 4. In other words, the session controlling unit 30 allows the application server session 103 to visualize the selected content 200 in the one or more storage services 4. Selected content is a subset of the two storage services 4. The application streamer 40 generates a representation of a web page 300 incorporating the application session 101 and the application streamer 40 streams the representation of the web page 300 to a client 3. The client 3 is a client browser. For example, the client browser 3 may be Internet Explorer, or Mozilla Firefox, or Safari, or any other client browser.

Figure 2:
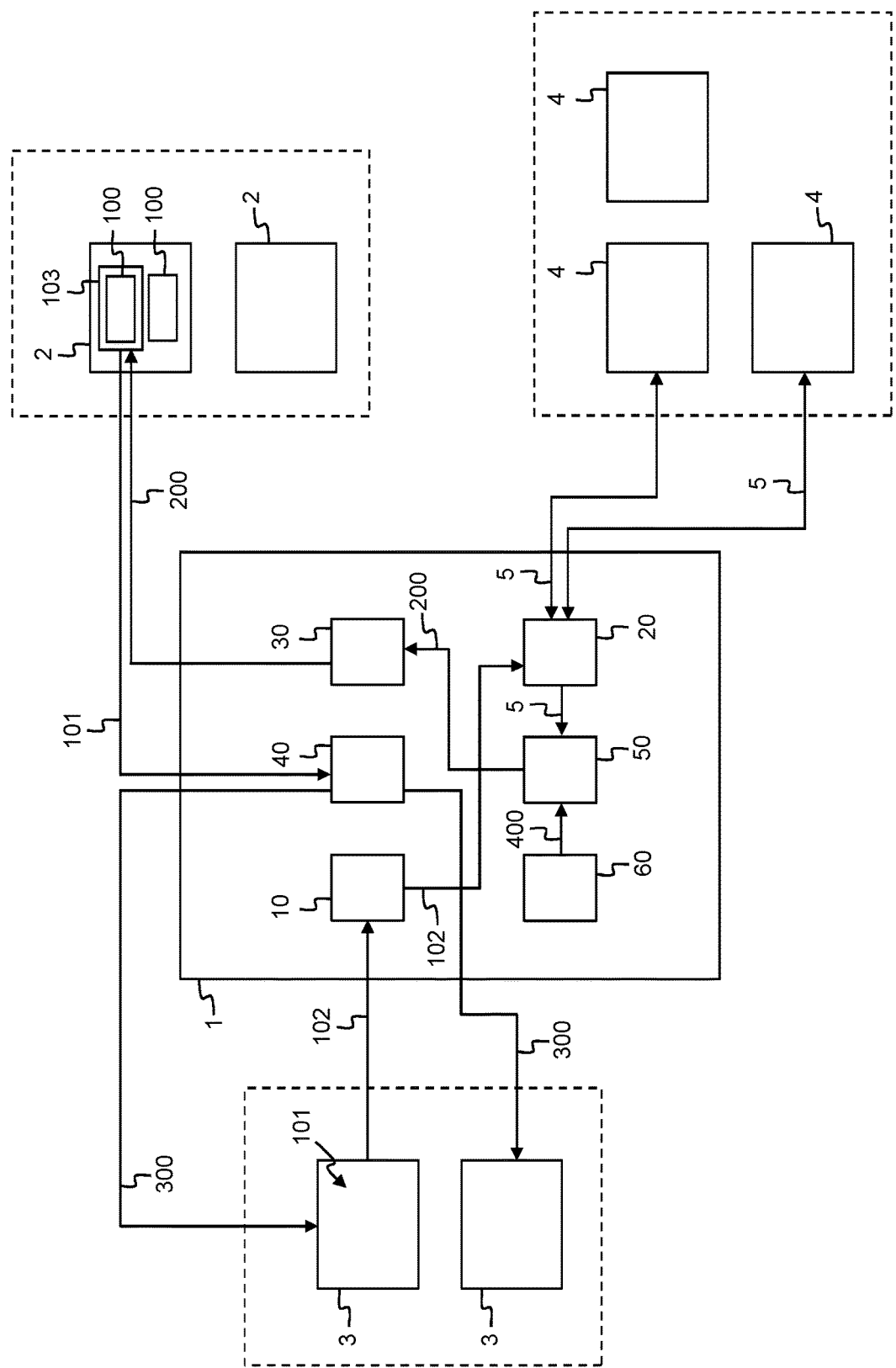
FIG. 2 schematically illustrates an embodiment of a broker according to the present invention for controlling an application session streamed to two clients.

According to an embodiment shown in FIG. 2, a broker 1 for controlling an application session 101 of an application 100 running on a remote application server 2 comprises a receiving module 10, a connecting module 20, a session controlling unit 30, an application streamer 40, a selected content determining unit 50 and a rule generating administrator interface 60. The receiving module 10 receives a request 102 for the application session 101 of an application 100 running on a remote application server 2. The request 102 is communicated to the connecting module 20, which connects with two storage services 4. According to an alternative embodiment, the connecting module 20 connects with one or more storage services 4, for example one, two, three, four, five, ten, a hundred storage services, etc. The storage services 4 may be for example online storage services such as Google Drive, Amazon, Dropbox, etc., and/or private storage services such as hard disks and/or USB-connected storage services, and/or cloud-based storage services, etc. The connecting module 20 for example connects with the two storage services 4 according to a file service protocol, for example the common internet file system specification, NFS, FTP, WebDAV, and file service protocols for example known under the trademark names OneDrive, Box, Dropbox, Storage Made Easy also referred to as SME, Amazon Simple Storage Service also referred to as S3, SharePoint, Nomadesk, Stewart, etc. The connecting module 20 is provided with visibility on content 5 of the storage services 5. The rule generating administrator interface 60 enables an administrator to generate one or more rules 400. The rules 400 are content format based. According to alternative embodiments, the rules 400 are content type based, or are application based, or are used based, or are user type based, or are directory based or are geolocation based. A user is a user of the application session 101 of the application 100 running on the remote application server 2. A directory is a directory of a storage service 4. The selected content determining unit 50 is operationally coupled to the connecting module 20 and the selected content determining unit 50 determines selected content 200 of the two storage services 4 based on one or more rules 400 received from the rule generating administrator interface 60. The session controlling unit 30 provides to an application server session 103 of the remote application server 2 visibility on selected content 200 in the two storage services 4. Selected content is a subset of the two storage services 4. The application streamer 40 generates a representation of a web page 300 incorporating the application session 101 and the application streamer 40 streams the representation of the web page 300 to two clients 3. According to an alternative embodiment, the application streamer 40 generates a representation of a web page 300 incorporating the application session 101 and the application streamer 40 streams the representation of the web page 300 to more than two clients 3, for example to three, four, five, ten, hundreds of client browsers 3.

According to an embodiment shown in FIG. 2, a broker 1 for controlling an application session 101 of an application 100 managed by an application server session 103 running on a remote application server 2 comprises a receiving module 10, a connecting module 20, a session controlling unit 30, an application streamer 40, a selected content determining unit 50 and a rule generating administrator interface 60. The receiving module 10 receives a request 102 for the application session 101 of an application 100 running on a remote application server 2. The request 102 is communicated to the connecting module 20, which connects with two storage services 4 according to the request 102. According to an alternative embodiment, the connecting module 20 connects with one or more storage services 4, for example one, two, three, four, five, ten, a hundred storage services, etc. The storage services 4 may be for example online storage services such as Google Drive, Amazon, Dropbox, etc., and/or private storage services such as hard disks and/or USB-connected storage services, and/or cloud-based storage services, etc. The connecting module 20 for example connects with the two storage services 4 according to a file service protocol, for example the common internet file system specification, NFS, FTP, WebDAV, and file service protocols for example known under the trademark names OneDrive, Box, Dropbox, Storage Made Easy also referred to as SME, Amazon Simple Storage Service also referred to as S3, SharePoint, Nomadesk, Stewart, etc. The connecting module 20 is provided with visibility on content 5 of the storage services 5. The rule generating administrator interface 60 enables an administrator to generate one or more rules 400. The rules 400 are content format based. According to alternative embodiments, the rules 400 are content type based, or are application based, or are user based, or are user type based, or are directory based or are geolocation based. A user is a user of the application session 101 of the application 100 running on the remote application server 2. A directory is a directory of a storage service 4. The selected content determining unit 50 is operationally coupled to the connecting module 20 and the selected content determining unit 50 determines selected content 200 of the two storage services 4 based on one or more rules 400 received from the rule generating administrator interface 60. The selected content determining unit 50 determines selected content 200 which may be visualized by the application server session 103 on the remote application 2. The session controlling unit 30 provides to an application server session 103 of the remote application server 2 visibility on selected content 200 in the two storage services 4. In other words, the session controlling unit 30 allows the application server session 103 to visualize the selected content 200 in the one or more storage services 4. Selected content is a subset of the two storage services 4. The application streamer 40 generates a representation of a web page 300 incorporating the application session 101 and the application streamer 40 streams the representation of the web page 300 to two clients 3. The clients 3 are client browsers. For example, the client browsers 3 may be Internet Explorer, or Mozilla Firefox, or Safari, or any other client browser. According to an alternative embodiment, the application streamer 40 generates a representation of a web page 300 incorporating the application session 101 and the application streamer 40 streams the representation of the web page 300 to more than two client browsers 3, for example to three, four, five, ten, hundreds of client browsers 3.

Figure 3:
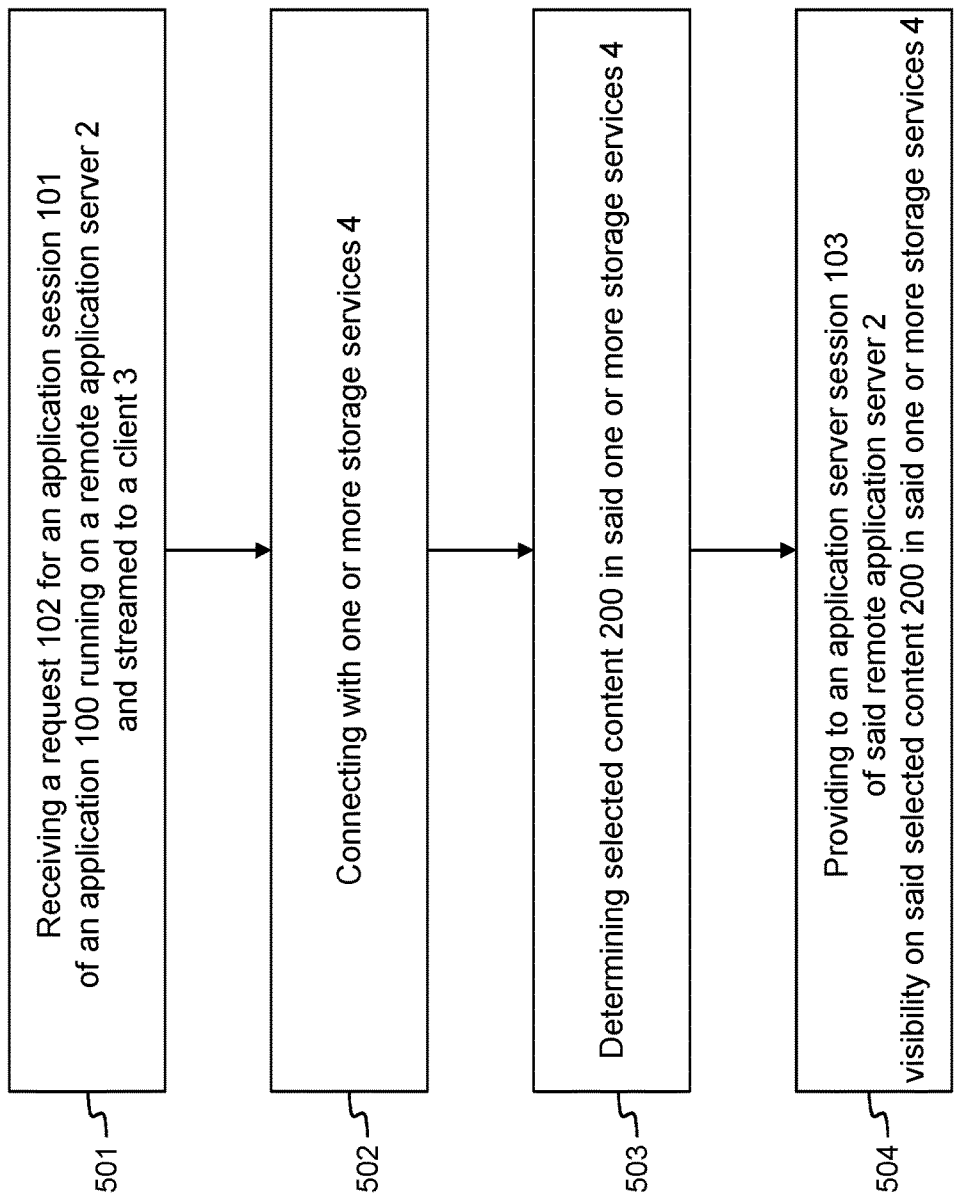
FIG. 3 schematically illustrates the steps of the method according to the present invention.

FIG. 3 schematically illustrates the steps of the method according to the present invention. In step 501, a request 102 is received from an application session 101 of an application 100 running on a remote application server 2 and streamed to a client 3. Then, a connection with one or more storage services 4 is established in step 502. Selected content 200 in the one or more storage services 4 is selected in step 503. Finally, in step 504, an application server session 103 of the remote application server 2 is provided visibility on the selected content 200 in the one or more storage services 4.

Figure 4:
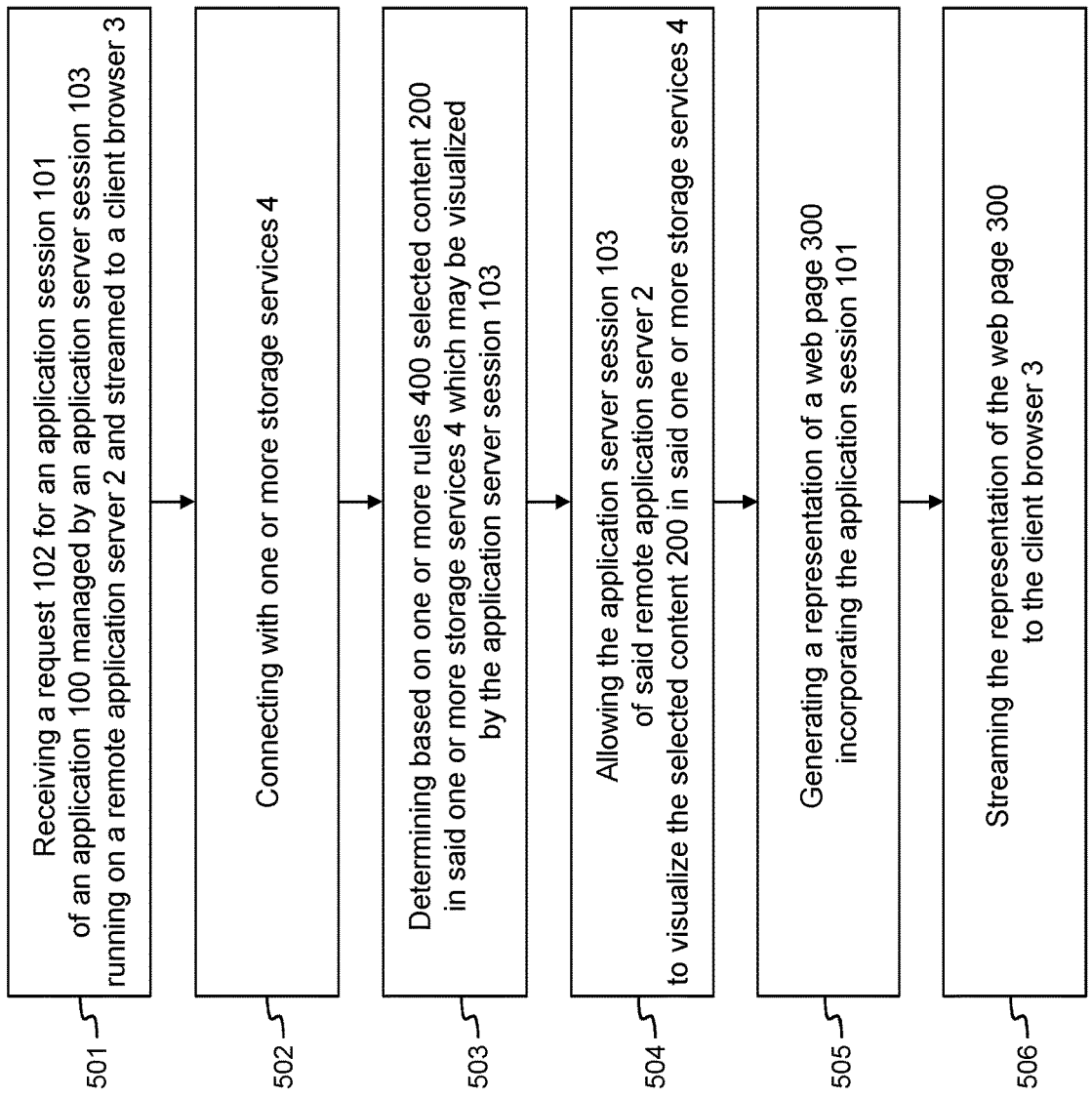
FIG. 4 schematically illustrates the steps of the method according to the present invention.

FIG. 4 schematically illustrates the steps of the method according to the present invention. In step 501, a request 102 is received from an application session 101 of an application 100 managed by an application server session 103 running on a remote application server 2 and streamed to a client browser 3. Then, a connection with one or more storage services 4 according to the received request 102 is established in step 502. Selected content 200 in the one or more storage services 4 which may be visualized by the application server session 103 on the remote application server 2 is selected in step 503 based on one or more rules 400. In step 504, an application server session 103 of the remote application server 2 is allowed to visualize the selected content 200 in the one or more storage services 4. A representation of a web page 300 incorporating the application session 101 is generated in step 505. Finally, the representation of the web page 300 is streamed to the client browser 3 in step 506.

Figure 5:
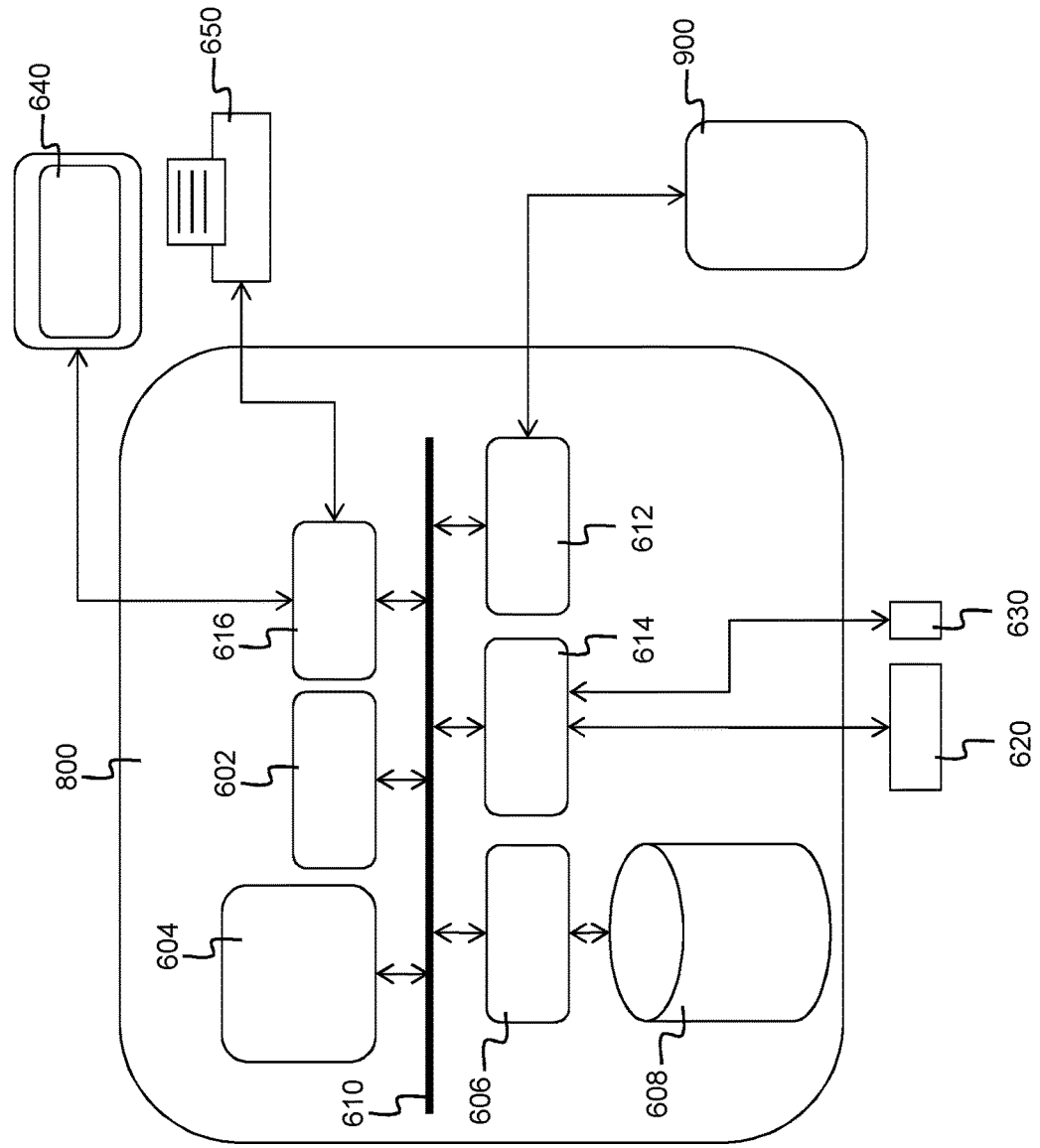
FIG. 5 schematically illustrates a suitable computing system for hosting the broker of FIG. 1.

FIG. 5 shows a suitable computing system 800 for hosting the web broker of FIG. 1. Computing system 800 may in general be formed as a suitable general purpose computer and may comprise a bus 610, a processor 602, a local memory 604, one or more optional input interfaces 614, one or more optional output interfaces 616 a communication interface 612, a storage element interface 606 and one or more storage elements 608. Bus 610 may comprise one or more conductors that permit communication among the components of the computing system. Processor 602 may include any type of conventional processor or microprocessor that interprets and executes programming instructions. Local memory 604 may include a random access memory (RAM) or another type of dynamic storage device that stores information and instructions for execution by processor 602 and/or a read only memory (ROM) or another type of static storage device that stores static information and instructions for use by processor 604. Input interface 614 may comprise one or more conventional mechanisms that permit an operator to input information to the computing device 800, such as a keyboard 620, a mouse 630, a pen, voice recognition and/or biometric mechanisms, etc. Output interface 616 may comprise one or more conventional mechanisms that output information to the operator, such as a display 640, a printer 650, a speaker, etc. Communication interface 612 may comprise any transceiver-like mechanism such as for example two 1 Gb Ethernet interfaces that enables computing system 800 to communicate with other devices and/or systems, for example mechanisms for communicating with one or more other computing systems 900. The communication interface 612 of computing system 800 may be connected to such another computing system by means of a local area network (LAN) or a wide area network (WAN, such as for example the internet, in which case the other computing system 680 may for example comprise a suitable web server. Storage element interface 606 may comprise a storage interface such as for example a Serial Advanced Technology Attachment (SATA) interface or a Small Computer System Interface (SCSI) for connecting bus 510 to one or more storage elements 608, such as one or more local disks, for example 1TB SATA disk drives, and control the reading and writing of data to and/or from these storage elements 608. Although the storage elements 508 above is described as a local disk, in general any other suitable computer-readable media such as a removable magnetic disk, optical storage media such as a CD or DVD, -ROM disk, solid state drives, flash memory cards, . . . could be used.

The web broker of FIG. 1 can be implemented as programming instructions stored it local memory 604 of the computing system 800 for execution by its processor 602. Alternatively the web broker of FIG. 1 could be stored on the storage element 608 or be accessible from another computing system 900 through the communication interface 612.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A broker adapted to control an application session of an application managed by an application server session on a remote application server and streamed to a client browser, said broker comprising:
   a receiving module, adapted to receive a request for said application session;
   a connecting module, configured to receive said request and to connect with one or more storage services according to said request;
   a selected content determining unit adapted to determine based on one or more rules selected content in said one or more storage services which may be visualized by said application server session on said remote application server;
   a session controlling unit, adapted to provide said application server session on said remote application server visibility on said selected content in said one or more storage services without copying or downloading said selected content from the one or more storage services to the remote application server; and
   an application streamer adapted to:
   generate a representation of a web page incorporating said application session and said selected content; and
   stream said representation of said web page to said client browser;
   wherein the broker is hosted in a computing system.

2. A broker according to claim 1, wherein said session controlling unit is further adapted to allow said application server session on said remote application server to visualize said selected content in said one or more storage services via a remote desktop protocol.

3. A broker according to claim 1, wherein said connecting module is further adapted to connect with one or more storage services according to a file service protocol.

4. A broker according to claim 1, wherein said broker further comprises a rule generating administrator interface operationally coupled to said selected content determining unit and enabling an administrator to generate said one or more rules.

5. A broker according to claim 4, wherein said one or more rules are based on one or more of the following: content format; content type; said application; user; user type; directory; geolocation of said client.

6. A broker according to claim 1, wherein said selected content is a subset of said one or more storage services.

7. A broker according to claim 1, wherein said application streamer is further adapted to: generate a representation of a web page incorporating said application session; and stream said representation of said web page to two or more clients.

8. A method for controlling an application session of an application managed by an application server session running on a remote application server and streamed to a client browser, said method comprising the steps of:
   receiving a request for said application session;
   connecting with one or more storage services according to said request;
   determining based on one or more rules selected content in said one or more storage services which may be visualized by said application server session on said remote application server;
   providing said application server session on said remote application server visibility on said selected content in said one or more storage services without copying or downloading said selected content from the one or more storage services to the remote application server;
   generating a representation of a web page incorporating said application session and said selected content; and
   streaming said representation of said web page to said client browser.

9. A method for controlling an application session of an application managed by an application server session running on a remote application server and streamed to a client browser, said method comprising the steps of:
   receiving a request for said application session;
   connecting with one or more storage services according to said request;
   determining content available in said one or more storage services;
   determining based on one or more rules selected content from said content available in said one or more storage services which may be visualized by said application server session on said remote application server, said one or more rules comprising credentials for said application session, thereby selecting only selected content which may be made visible to said application server session for said credentials and through said broker;
   providing said application server session on said remote application server to visibility on said selected content in said one or more storage services without copying or downloading said selected content from said one or more storage services to said remote application server;
   generating a representation of a web page incorporating said application session and said selected content; and streaming said representation of said web page to said client browser.

\* \* \* \* \*